Nov. 17, 1959

E. N. LIDE 2,913,668

RATIO VOLTMETER

Filed Oct. 30, 1956

INVENTOR
*Edward N. Lide*

BY W. R. Maltby
Z S Flax

ATTORNEYS

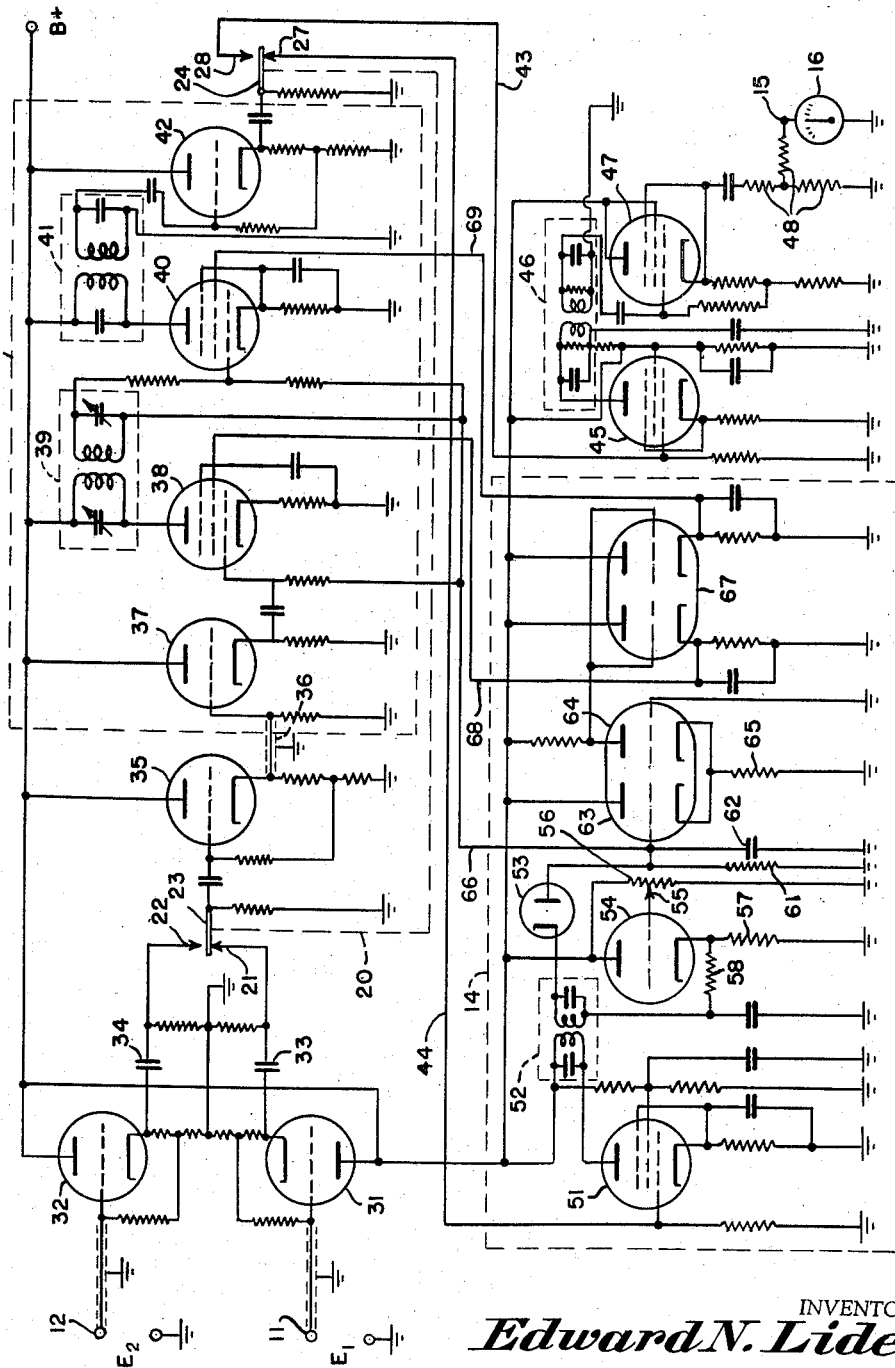

United States Patent Office 2,913,668
Patented Nov. 17, 1959

2,913,668

RATIO VOLTMETER

Edward N. Lide, Chamblee, Ga., assignor to the United States of America as represented by the Secretary of the Navy Application October 30, 1956, Serial No. 619,365

1 Claim. (Cl. 324—140)

(Granted under Title 35, U.S. Code (1952), sec. 266)

The invention described herein may be manufactured and used by or for the Government of the United States of America for governmental purposes without the payment of any royalties thereon or therefor.

The present invention relates to ratio voltmeters and more particularly to a ratio voltmeter operable over a wide range of voltage ratios and frequencies.

An object of the present invention is to provide a direct reading indication of the ratio of two voltages.

Another object is to provide a ratio voltmeter usable for high frequency A.C. voltages.

A further object of the invention is to provide a meter to read the ratio of two voltages having different frequencies.

The exact nature of this invention as well as other objects and advantages will be readily apparent from consideration of the following specification relating to the accompanying drawings in which:

Figure 2 is a schematic circuit diagram of a preferred embodiment of the present invention.

Figure 1:
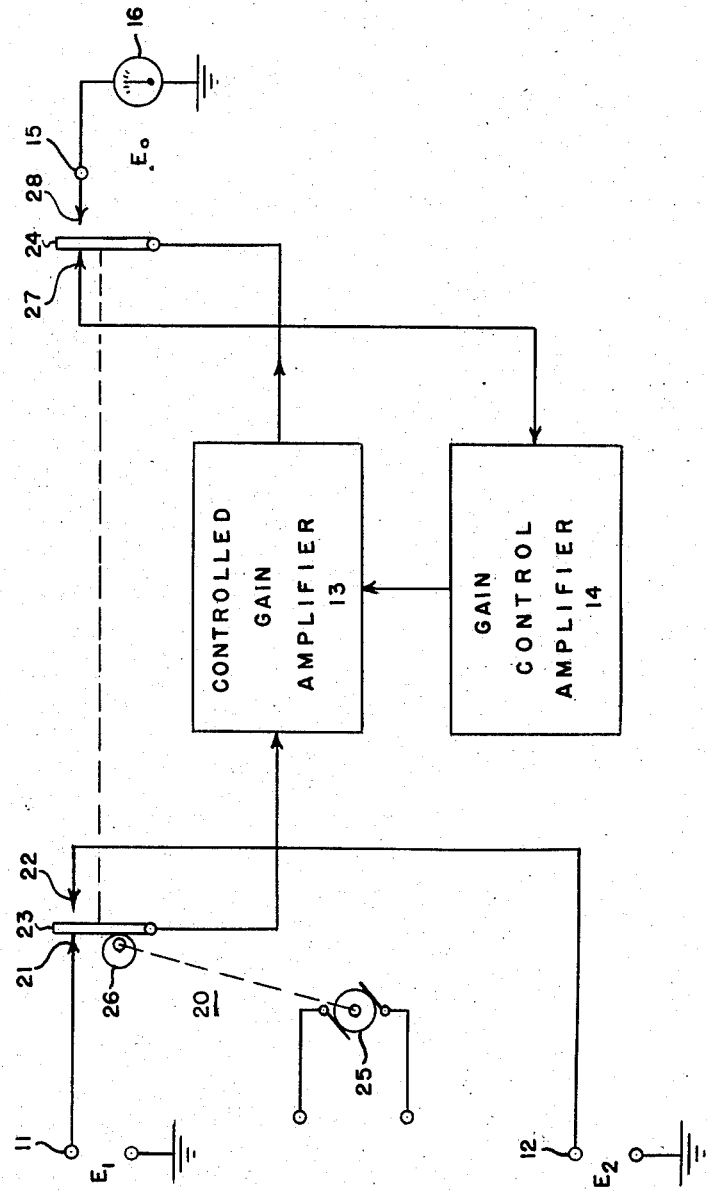
Figure 1 shows a block diagram of a simplified ratio voltmeter in accordance with the present invention.

As shown in Figure 1, the two voltages $E_1$ and $E_2$, the ratio of which it is desired to determine, are connected through terminals 11 and 12 to two contacts 21 and 22 respectively of a chopper 20 having two armatures 23 and 24 which may be driven synchronously by motor 25 through cam 26. Chopper 20 may take other forms well known in the art such as a magnetic chopper or preferably, where very high chopping frequencies are desired, an electronic switch. Voltages $E_1$ and $E_2$ are applied alternately through armature 23 to the input of a controlled gain amplifier 13. At the time $E_1$ is connected to the input of amplifier 13, the output is connected through armature 24 and contact 27 to the input of gain control amplifier 14; and when $E_2$ is connected to amplifier 13, the output is connected through armature 24 and contact 28 to output terminal 15 where it may be read as $E_0$ on a meter 16.

This circuit operates as follows. When $E_1$ passes through amplifier 13 it is amplified by a factor G and applied to the gain control amplifier 14, which controls the gain G of amplifier 13 to make the output equal to a constant voltage K. Thus $E_1 G = K$ or $$G = \frac{K}{E_1}$$

During the alternate half cycle of the chopper while $E_2$ is applied to amplifier 13, the gain remains the same so that $E_0 = E_2 G$. Therefore $$E_0 = \frac{K E_2}{E_1}$$

e.g. the output voltage is equal to the ratio of $E_2$ and $E_1$ multiplied by a factor K. This factor may be determined by applying the same voltage to terminals 11 and 12. Meter 16 is calibrated to read the ratio directly.

In the particular embodiment of the invention shown schematically in Figure 2, two A.C. voltages $E_1$ and $E_2$ are applied at terminals 11 and 12 and connected to contacts 21 and 22 of chopper 20 through cathode followers 31 and 32 and coupling capacitors 33 and 34, in order to decrease the affect of cable capacitance. Armature 23 of the chopper is connected to cathode follower 35 to apply the chopped signal through a shielded cable 36 to the input tube 37 of amplifier 13. Amplifier 13 comprises input tube 37 cathode coupled to a variable gain pentode 38 which is transformer coupled to a second variable gain pentode 40 through tuned transformer 39. Pentode 40 is coupled through tuned transformer 41 and cathode follower 42 to the other armature 24 of chopper 20. Transformers 39 and 41 are tuned to the frequency of input voltages $E_1$ and $E_2$.

Contact 28 of chopper 20 is connected through lead 43 to an output circuit comprising pentode amplifier 45, tuned transformer 46, cathode follower 47 and impedance matching network 48 to terminal 15, where the output may be observed on meter 16 which is calibrated to read the ratio of the input voltages. This output consists of pulses of A.C. voltage during the periods when $E_2$ is connected to amplifier 13.

Contact 27 of chopper 20 is connected through lead 44 to gain control amplifier 14, which comprises pentode 51 coupled through tuned transformer 52 to diode detector 53. The signal at this point consists of pulses of A.C. voltage during the periods when $E_1$ is connected to amplifier 13. The cathode of diode 53 is connected through the secondary of transformer 52 and resistor 58 to the cathode of tube 54. The grid of tube 54 is connected to movable contact 55 of potentiometer 56 which is connected between the positive source of voltage at the plate of the tube and ground. Tube 54 acts as a cathode follower to maintain a constant voltage, which is set by the position of adjustable contact 55, across its cathode resistor 57. The plate of diode 53 is connected to the grid of triode 63 and the junction of resistor 61 and capacitor 62, which are in parallel between the grid of triode 63 and ground, and to the control grids of variable gain pentodes 38 and 40 of amplifier 13 through lead 66. The cathode of triode 63 is coupled across a common cathode resistor 65 to the cathode of grounded grid triode 64, which has its plate directly connected to the grids of dual triode 67. Both triode sections of this tube are connected as cathode followers to control the potential of the screen grids of pentodes 38 and 40 of amplifier 13 through leads 68 and 69 respectively.

Whenever the output of amplifier 13, during the period that $E_1$ is connected thereto, is such that the peak negative voltage applied to the cathode of diode 53 at the secondary of transformer 52 exceeds the preset positive bias across resistor 57, diode 53 will conduct and apply a negative control voltage to the grids of tubes 63, 38, and 40. This voltage is also amplified in grounded grid triode 64 and is applied through the dual cathode follower 67 to decrease the potential of the screen grids of tubes 38 and 40. The gain of these latter tubes is thus decreased, diminishing the output of amplifier 13 until the peak voltage output of transformer 52 is just equal to the preset bias at resistor 57. The time constant of resistor 61 and capacitor 62 is long relative to one cycle of chopper 20, so that the negative control voltage is maintained during the period when $E_2$ is connected to amplifier 13. In this manner the amplitude of $E_1$ controls the amplification of $E_2$, so that $E_0$ is a function of both voltages as previously described.

In the above described embodiment of the invention, transformer coupled amplifier stages are used for convenience because the particular input voltages involved are of relatively high frequency. With proper design of the amplifiers the input voltages need not be of the same frequency, and, if D.C. amplifiers are used, one or both of the input voltages may be D.C. Where the chopper frequency is low relative to the frequency of the A.C. voltage inputs, the output is the ratio of the peak values. However, the chopper frequency selected may be high relative to the frequency of the input voltages, in which case the output signal would be equal to their instantaneous ratio. Obviously, many modifications and variations of the present invention are possible in the light of the above teachings. It is therefore to be understood that within the scope of the appended claim, the invention may be practiced otherwise than as previously described and that it is intended to cover all changes and modifications which do not constitute departures from the spirit and scope of the invention.

What I claim is:

A device for determining the ratio between two independently variable voltages comprising a first input terminal and a second input terminal adapted to be connected to said voltages, amplifying means having an input circuit and an output circuit, the gain of said amplifying means being variable, gain control means operable when connected to said output circuit to adjust the gain of said amplifying means to produce a predetermined voltage in said output circuit and to maintain the gain at said adjusted value when disconnected from said output terminals, indicating means comprising a voltmeter calibrated in ratio above and below said predetermined voltage, cyclically operating synchronous switching means operable independent of the presence of said voltages to alternately simultaneously connect said first input terminal to said input circuit and said gain control means to said output circuit during the first period of each cycle and to simultaneously connect said second input terminal to said input circuit and said indicating means to said output circuit during the second period of each cycle, whereby said indicating means shows the ratio of said voltages.

References Cited in the file of this patent

UNITED STATES PATENTS

| | | |
|---|---|---|
| 1,918,822 | Norman | July 18, 1933 |
| 2,037,107 | Abraham | Apr. 14, 1936 |
| 2,144,710 | Romnes | Jan. 24, 1939 |
| 2,542,183 | Edwards | Feb. 20, 1951 |
| 2,619,552 | Kerns | Nov. 25, 1952 |
| 2,714,136 | Greenwood | July 26, 1955 |
| 2,741,668 | Iffland | Apr. 10, 1956 |
| 2,763,838 | McConnell | Sept. 18, 1956 |
| 2,802,181 | Gorski | Aug. 6, 1957 |